United States Patent [19]

Furuhashi et al.

[11] Patent Number: 4,850,766
[45] Date of Patent: * Jul. 25, 1989

[54] PULL STUD

[75] Inventors: Ryoichi Furuhashi, Aichi; Shinsuke Nagase, Komaki, both of Japan

[73] Assignee: Yamazaki Mazaki Corporation, Newa, Japan

[*] Notice: The portion of the term of this patent subsequent to Sep. 27, 2005 has been disclaimed.

[21] Appl. No.: 214,527

[22] Filed: Jul. 1, 1988

Related U.S. Application Data

[62] Division of Ser. No. 1,465, Jan. 8, 1987, Pat. No. 1,773,800.

[51] Int. Cl.⁴ ........................ B23C 5/16; B23Q 3/155
[52] U.S. Cl. ........................... 409/234; 29/568; 40/913; 279/1 TS
[58] Field of Search .................. 29/568; 409/233, 234, 409/80; 229/1 TS; 40/913; 408/3, 16, 239 R, 239.1

[56] References Cited

U.S. PATENT DOCUMENTS

| | | | |
|---|---|---|---|
| 3,173,204 | 3/1965 | Anthony | 29/568 |
| 3,568,566 | 3/1971 | Weidig | 409/233 |
| 3,858,892 | 1/1975 | Rutschke | 29/568 |
| 4,588,339 | 5/1986 | Bilz | 29/568 |

FOREIGN PATENT DOCUMENTS

| | | | |
|---|---|---|---|
| 3326615 | 1/1985 | Fed. Rep. of Germany | 279/1 TS |
| 751512 | 7/1980 | U.S.S.R. | 279/1 TS |

Primary Examiner—William Briggs
Attorney, Agent, or Firm—Cushman, Darby & Cushman

[57] ABSTRACT

A pull stud detachably attached to a tool holder includes a tool data storing element for storing tool data. The arrangement being such that tool data of each tool can be stored in the tool data storing element within the pull stud attached to the tool holder holding the tool.

1 Claim, 4 Drawing Sheets

PULL STUD

This is a division of application Ser. No. 001,465, filed Jan. 8, 1987 now U.S. Pat. No. 4,773,800.

BACKGROUND OF THE INVENTION

This invention relates to a pull stud detachably attached to a tool holder.

Heretofore, when a machining was to be started, an operator operated input means such as key board to input data of various tools which are to be used in a machine tool, such as tool number, tool name, tool diameter, tool length, service life, used hours, cutting conditions and the like in a predetermined storage area such as tool data memory provided within a numerical controller.

However, the above conventional method has the shortcomings in that the operator is required to take a trouble to input the tool data of tools set to a tool magazine, etc. everytime the tools are set, which is troublesome work and often invites input errors, etc.

Therefore, there has been used another method in which tools are assigned with bar codes, etc. and tool data such as tool number etc. are collected by reading the bar codes. However, this conventional method again has the shortcomings in that storable information quantity is extremely limited.

Furthermore, another method is easily thinkable in which a memory element is provided within a tool holder to record tool data. However, since the tool holder is required to be rotated at a high speed together with a tool when machining, the problem on the balance of rotation arises. In addition, the tool holder is exclusively used for a certain tool (i.e., a tool corresponding to the tool data which the memory element stored within the tool holder memorizes) and therefore tool holders must be prepared as many as the number of tools to be used, which is quite uneconomical.

It is therefore an object of the present invention to provide a pull stud to be attached to a tool holder, wherein problems on balance of rotation and problems of exclusive use of a tool holder by a certain tool can be solved and an operator is not required to input tool data everytime tools are set and in addition to large quantity of data can be stored.

SUMMARY OF THE INVENTION

That is, the present invention comprises a tool data storage element for storing tool data provided within a pull stud.

According to the present invention, tool data of a tool held by a tool holder attached to a pull stud is stored in a storage element and a required tool data can be collected simply by reading data regarding the tool held by the tool holder from the storage element. Therefore, there can be collected tool data for each tool in a shorter time compared with the method in which an operator inputs the tool data from key board, etc. everytime the tool is set and with sure. In addition, extremely large quantity of tool data can be stored compared with the method in which bar codes, etc. are used.

Furthermore, the pull stud, in which the tool data storage element is stored, is usually attached to the tool holder with its center held in alignment with the center of rotation of the tool holder. Therefore, even if the tool is rotated at a high speed for machining, the tool data storage element stored in the pull stud hardly renders an adverse influence to balance of rotation of the entire apparatus including the tool and tool holder and a reliability is high.

Furthermore, since the pull stud is detachably attached to the tool holder, the corresponding relationship of tool data regarding a tool and a tool depends solely on the pull stud. Therefore, a pull stud corresponding to a tool attached the tool holder may be attached to the tool holder. Therefore, the tool holder is never exclusively used for a certain tool. Instead, it can be widely used for various tools.

DESCRIPTION OF THE PREFERRED EMBODIMENT

Figure 2:
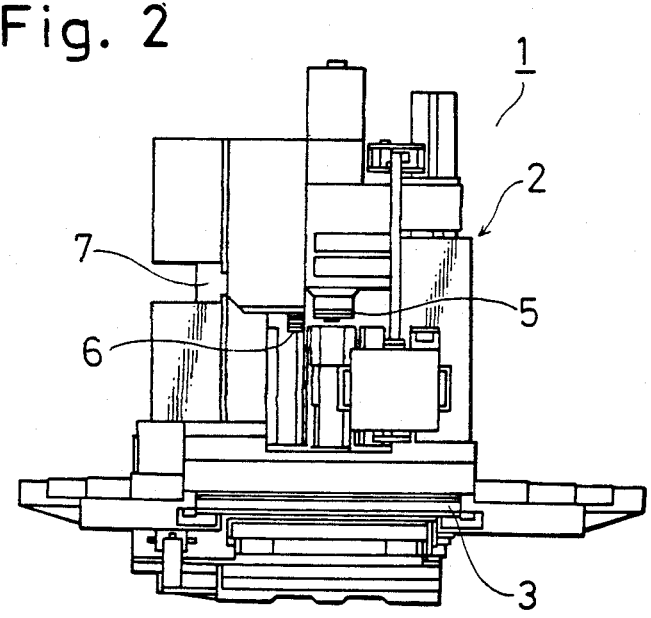
FIG. 2 is a front view showing one example of a machining center in which a tool attached with a pull stud of the present invention is to be used.
Figure 3:
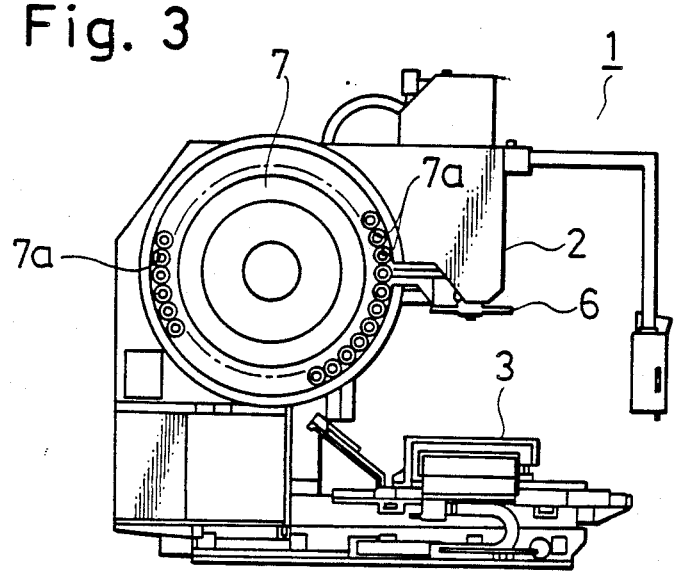
FIG. 3 is a side view of FIG. 2.
Figure 4:
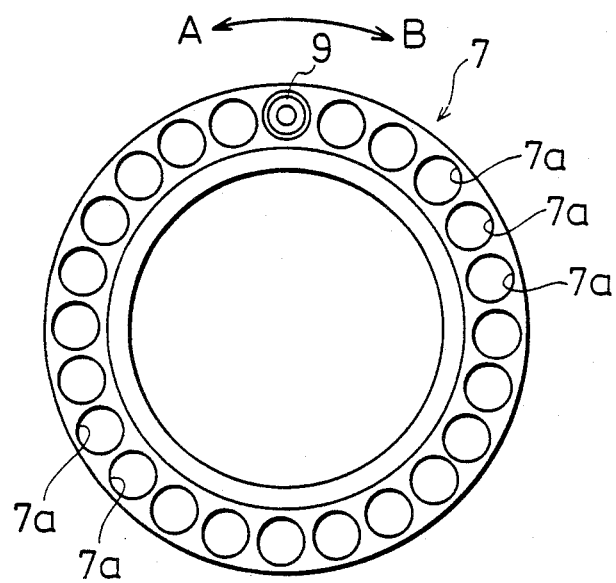
FIG. 4 is a front view showing a tool magazine.

A machining center 1 as a machine tool, as shown in FIG. 2, has a machine body 2. The machine body 2 is movably provided with a table 3 for supporting a workpiece thereon and moving in two directions perpendicular with respect to each other in a horizontal plane. Above the table 3 in the figure, a spindle 5 to be attached with a tool is rotatably provided. Provided to left-hand side of the spindle 5 of FIG. 2 is a tool changer 6. The machine body 2, as shown in FIG. 3, is rotatably provided with a tool magazine 7 formed in a disk shape as a whole. At the outer peripheral portion of the tool magazine 7, tool pockets 7a for removably containing a tool 9 are arranged as shown in FIGS. 3 and 4.

Figure 1:
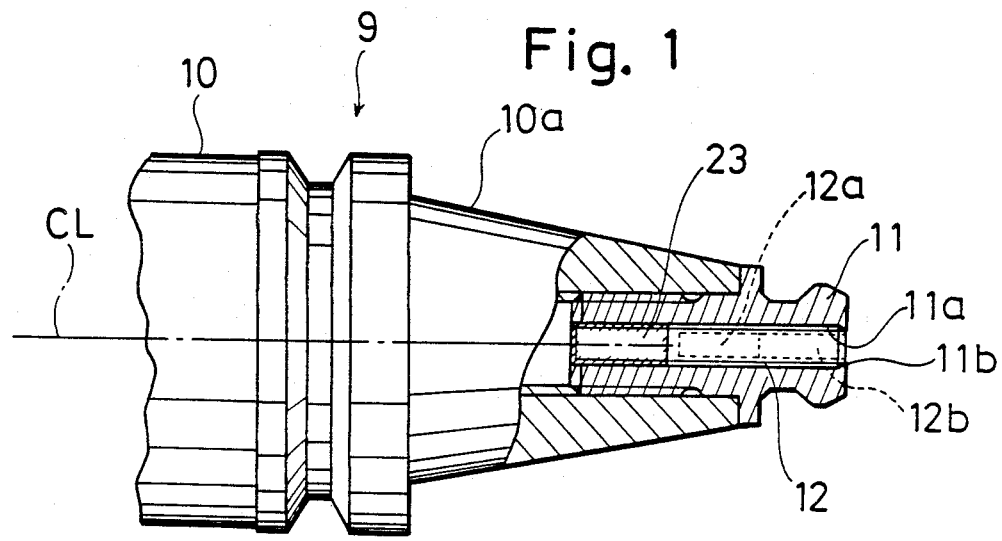
FIG. 1 is an enlarged view of a tool holder portion in which one embodiment of a pull stud according to the present invention is used.

In each tool pocket 7a, the tool 9 held by a tool holder 10 is contained. Each tool holder 10, as shown in FIG. 1, is formed with a tapered shank portion 10a. Threadedly detachably attached to the right end portion of the shank portion 10a of FIG. 1 is a pull stud 11, which is used when the tool holder 10 holding the tool 9 is attached to the spindle 5, with the axial center held in alignment with the center of rotation CL of the tool holder 10. The pull stud 11 is formed with a thread hole 11a, the center of the thread hole being held in alignment with the center of rotation CL of the tool holder 10. A tool data storage element 12 having a cylindrical configuration is threadedly engaged in and firmly secured to the thread hole 11a by means of a bond 23. The tool data storing element 12 includes a memory portion 12a and an input-output control portion 12b adapted to read and write tool data with respect to the memory portion 12a and give and take data to and from outside. The input-output control portion 12b is provided to an end face 11b side at the top portion of the pull stud 11.

Figure 5:
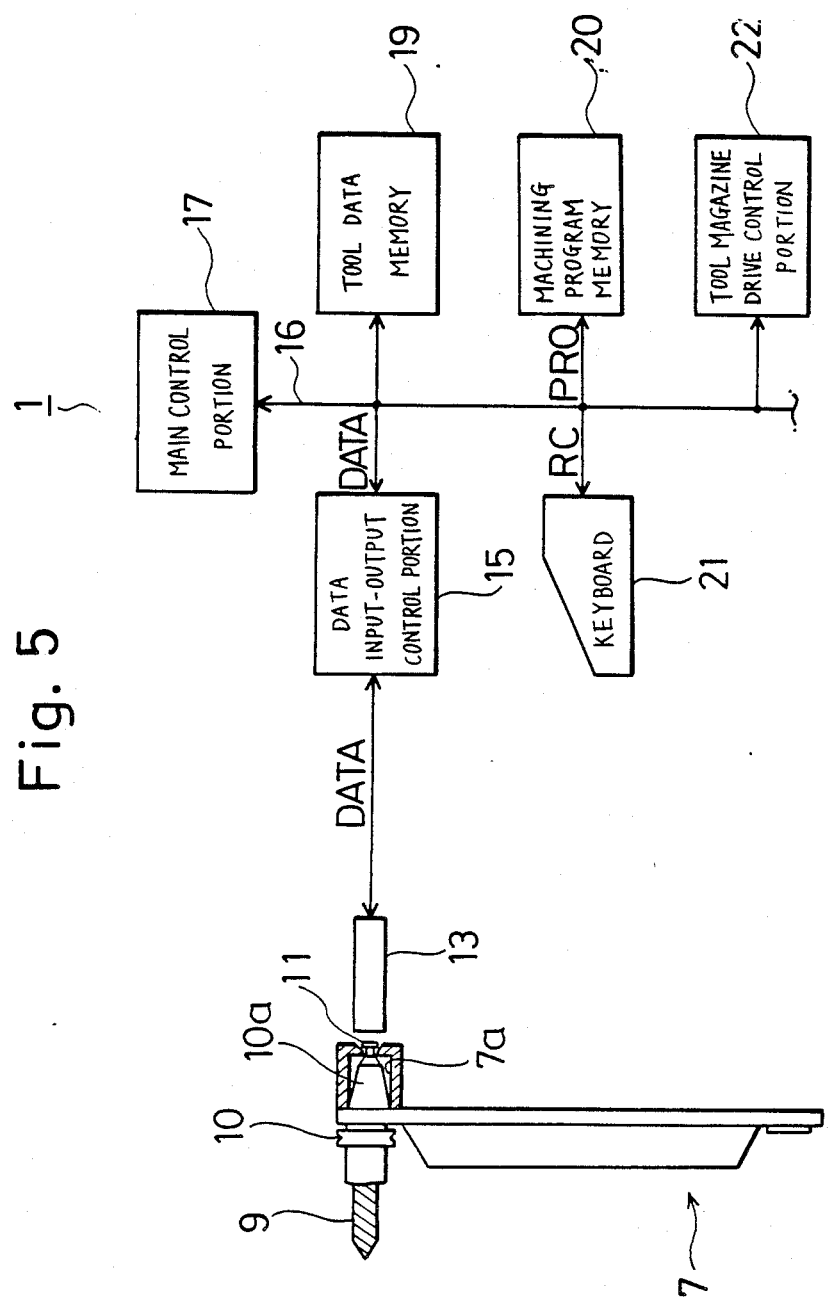
FIG. 5 is a control block diagram showing one example of a method of collecting tool data in machining center.

On the other hand, a read-write head 13 is provided onto the machine body 2 at a position corresponding to the tool pocket 7a of the tool magazine 7 as shown in FIG. 5. The read-write head 13 is connected with a tool data input-output control portion 15. The tool data input-output control portion 15 is connected with a main control portion 17, a tool data memory 19, a machining program memory 20, a key-board 21 and a tool magazine drive control portion 22, etc. through a bus line 16.

Operation of the present invention will be described. A workpiece is placed on the table 3. In this state, a machining is performed to the workpiece by a tool attached to the spindle 5 while exchanging tools between the tool magazine 7 and the spindle 5 by a tool changer 6. The machining is proceeded according to a machining program PRO stored in the machining program memory 20. In order to perform an accurate machining, the tool data DATA regarding tools 9 contained in the respective tool pockets 7a of the tool magazine 7 are required.

Therefore, prior to machining, an operator outputs a read command RC of the tool data to the main control portion 17 through the keyboard 21 at the time point when the tools 9 were set to the tool magazine 7 of the machining center 1. In respond to the command RC, the main control portion 17 commands the tool magazine control portion 22 and the tool data input-output control portion 15 to collect the tool data DATA. Based on the command from the main control portion 17, the tool magazine drive control portion 22 intermittently pivot the tool magazine 7 in the direction either shown by an arrow A or B every pitch of the tool pocket 7a. Then, the pull studs 11 of the tool holders 10 of the respective tools 9 contained in the tool pockets 7a are brought to be opposite to the read-write head 13 one after another due to every pitch rotation of the tool magazine 7. When the pull stud 11 of each tool 9 is brought to be opposite to the read-write head 13, the tool data input-output control portion 15 reads the tool data DATA regarding the tool 9 of the tool holder 10 attached with the pull stud 11 from the tool data storage element 12 of the pull stud 11 opposite to the red-write head 13 through the read-write head 13. In the memory portion 12a of the tool data storage element 12, the tool data DATA regarding the tools 9 held by the tool holders 10 attached with the pull studs 11 provided with the tool data storage element 12 are stored so that they can be read and written with respect to outside in a noncontact member through the input-output control portion 12b. The give and take of the tool data DATA between the read-write head 13 and the input-output control portion 12b is performed using the electromagnetic function such as magnetic induction and electromagnetic induction. Accordingly, information can be surely transmitted without being adversely affected by, for example, the dirty surface of the tool holder 10 as in the case that the reading is optically performed. Furthermore, as already described, the input-output control portion 12b is provided to the end face 11b at the top portion of the pull stud 11. This means that the end face 11b is kept projecting outside from the tool pocket 7a with the tool contained therein as shown in FIG. 5. Therefore, the read-write head 13 and the input-output control portion 12b can be electromagnetically interconnected with ease.

In this way, by intermittently pivoting the tool magazine 7 every pitch of the tool pocket 7a, the tool data DATA is read through the read-write head 13 and stored in the tool data memory 19. When the tool data DATA regarding all tools 9 contained in the tool magazine 7 were stored in the tool data memory 19, the main control portion 17 starts taking a machining action according to the machining program PRO based on such read and stored tool data DATA.

The give and take of the tool data DATA between the read-write head 13 and the tool data storage element 12 can be performed not only by the reading from the read-write head 13 side but also by the writing of new tool data DATA into the memory portion 12a from the read-write head 13 side as a matter of course. That is, since data such as tool used hours, etc. varies everytime a tool 9 is attached to the spindle 5 and used, the content of the memory portion 12a with regard to such data is rewritten and renewed through the tool data input-output control portion 15.

In the above-described embodiment, there was employed a usual tool with a tool holder which is not provided with a fluid feed hole for feeding a lubricating oil or a cooling water. However, there can be employed a tool provided with such fluid feed hole as will be described hereinafter. The identical parts to those described with reference to FIG. 1 are designated by identical numerals and description thereof will be omitted.

Figure 6:
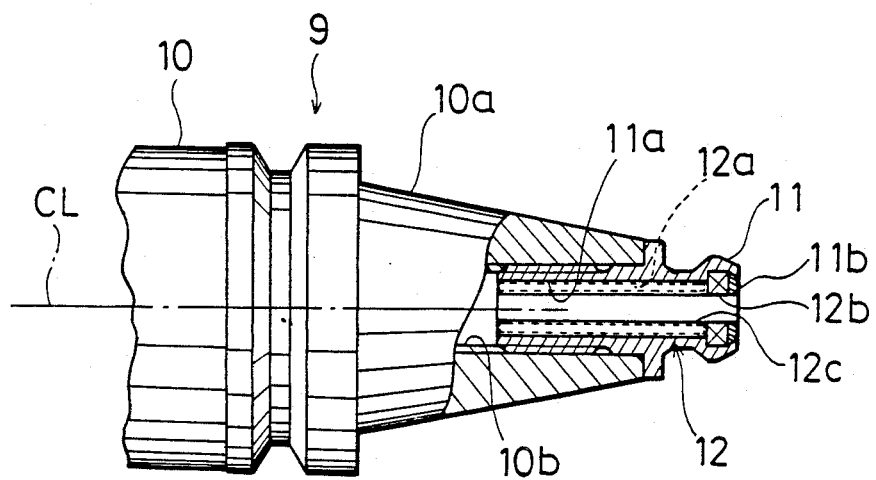
FIG. 6 is an enlarged view of a tool holder portion in which another embodiment of the present invention is used.

As is shown in FIG. 6, a pull stud 11 is formed with a hole 11a with its center held in alignment with the center of rotation CL of the tool holder 10. A generally cylindrical shaped tool data storage element 12 is inserted into the hole 11a and bonded thereto. The tool data storage element 12 includes a memory portion 12a and an input-output control portion 12b adapted to read and write tool data with respect to the memory portion 12a and give and take data to and from outside. The tool data storage element 12 is formed with a through hole 12c with its center held in alignment with the center of rotation CL. The through hole 12c is communicated with a fluid feed hole 10b formed within the tool holder 10 and adapted to feed a lubricating oil, a cooling water, etc. to a tool 9. In other words, the tool 9 is of a spindle through type.

As described in the foregoing, since the tool data storage element 12 is formed with a through hole 12c in the axial direction of the pull stud 11 for communicating with the fluid feed hole 10b formed in the tool holder 10, a lubricating oil, a cooling water and the like can be fed into the fluid feed hole 10b from a spindle side at the outside of the tool through the through hole 12c.

In the above-described embodiment, the tool data storage element 12 is arranged as such that when the pull stud 11 is attached to the tool holder 10, the tool data storage element 12 is positioned in the center of rotation CL of the tool holder 10. Therefore, the possible adverse affection of the storage element 11 to the balance of rotation of the tool holder 10 can be minimized.

Although the present invention has been described with reference to the preferred embodiments, the embodiments described herein are for illustrative purposes only and not in limitation thereof. Also, the scope of the present invention is defined in the appended claims and will not be binded by the description of the embodiments. Accordingly, it will be understood that all changes and modifications which belong to the appended claims fall within the true spirit and scope of the present invention.

What is claimed is:

1. An apparatus that allows a tool and tool holder to be removed from a tool magazine holder and which stores tool data for access by an external read-write device comprising:

a pull stud detachably mounted at one end to said tool holder and having a through hole that extends through a center portion of said pull stud; and tool data storing means disposed in said hole for storing tool data, said tool data storing means including:

memory means for storing said tool data, input/output means for writing tool data and reading tool data from said memory means to said external read-write device, and wherein said tool data storing means is disposed in said through hole in such a way to allow a fluid to pass through said through hole.

* * * * *

UNITED STATES PATENT AND TRADEMARK OFFICE
CERTIFICATE OF CORRECTION

PATENT NO. : 4,850,766
DATED : Jul. 25, 1989
INVENTOR(S) : FURUHASI et al

It is certified that error appears in the above-identified patent and that said Letters Patent is hereby corrected as shown below: Title page:

Please change:

"[73] Assignee: Yamazaki Mazaki Corporation,

Newa, Japan" to

--[73] Assignee: Yamazaki Mazak Corporation,

Niwa, Japan--;

"[62] Division of Ser. No. 1,464, Jan. 8, 1987, Pat. No.

1,773,800" to

--[62] Division of Ser. No. 1,465, Jan. 9, 1987, Pat. No.

4,773,800--.

Signed and Sealed this

Eighteenth Day of September, 1990

Attest:

HARRY F. MANBECK, JR.

*Attesting Officer*        *Commissioner of Patents and Trademarks*